(12) United States Patent
Buford et al.

(10) Patent No.: US 10,888,197 B2
(45) Date of Patent: Jan. 12, 2021

(54) GAS HEAT EXCHANGER WITH BAFFLE FOR DEEP FAT FRYER

(71) Applicant: Alto-Shaam, Inc., Menomonee Falls, WI (US)

(72) Inventors: Jeremy J. Buford, Horicon, WI (US); Jon Paul Flick, Wales, WI (US); George McMahon, Manchester, NH (US); Joshua James Shimel, Waukesha, WI (US); Thomas C. Stollenwerk, Mayville, WI (US)

(73) Assignee: Alto-Shaam, Inc., Menomonee Falls, WI (US)

( * ) Notice: Subject to any disclaimer, the term of this patent is extended or adjusted under 35 U.S.C. 154(b) by 279 days.

(21) Appl. No.: 15/933,620

(22) Filed: Mar. 23, 2018

(65) Prior Publication Data
US 2018/0271326 A1 Sep. 27, 2018

Related U.S. Application Data (60) Provisional application No. 62/476,179, filed on Mar. 24, 2017.

(51) Int. Cl.
*A47J 37/12* (2006.01)
*F23D 14/70* (2006.01)
*F28F 1/40* (2006.01)
*F28D 1/04* (2006.01)
*F23C 3/00* (2006.01)
*F23D 14/12* (2006.01)
*F24H 9/00* (2006.01)
*F24H 1/00* (2006.01)
*F23D 99/00* (2010.01)

(52) U.S. Cl.
CPC ............ *A47J 37/1247* (2013.01); *F23C 3/002* (2013.01); *F23C 3/004* (2013.01); *F23D 14/12* (2013.01); *F23D 14/70* (2013.01); *F23D 91/04* (2015.07); *F24H 1/0054* (2013.01); *F24H 9/0026* (2013.01); *F28D 1/04* (2013.01); *F28F 1/40* (2013.01); *F23D 2212/10* (2013.01)

(58) Field of Classification Search
CPC ........ A47J 37/1247; F23C 3/004; F23C 3/002
See application file for complete search history.

(56) References Cited

U.S. PATENT DOCUMENTS

| 2,655,944 | A | | 6/1950 | Proehl |
| 3,769,959 | A | | 11/1973 | Parker |
| 4,690,127 | A | | 9/1987 | Sank |
| 4,858,592 | A | * | 8/1989 | Hayek ................. A47J 37/1247 126/391.1 |
| 4,895,137 | A | | 1/1990 | Jones et al. |

(Continued)

FOREIGN PATENT DOCUMENTS

EP 2371250 10/2011

*Primary Examiner* — Jason L Vaughan
*Assistant Examiner* — Amanda Kreiling
(74) *Attorney, Agent, or Firm* — Boyle Fredrickson S.C.

(57) ABSTRACT

The present invention provides a deep fat fryer providing an oil vat for holding hot oil. The hot oil of the vat is heated by a heat exchanger system that includes a pair of heat tubes. Heat transfer along a length of the heat tubes is facilitated by a heat conductive baffle substantially filling the interior of the heat tubes in volume and length. Heated air and gas are forced through the dense and elongated baffle to facilitate heat transfer to the walls of the heat tubes.

17 Claims, 4 Drawing Sheets

(56) References Cited

U.S. PATENT DOCUMENTS

| | | | |
|---|---|---|---|
| 5,050,582 | A | 9/1991 | Almond et al. |
| 5,253,566 | A | 10/1993 | McCabe et al. |
| 5,577,438 | A | 11/1996 | Amitrano et al. |
| 5,580,238 | A * | 12/1996 | Charles, Sr. ............ F23D 14/70 |
| | | | 126/91 A |
| 5,632,197 | A | 5/1997 | Lubawy et al. |
| 5,746,195 | A * | 5/1998 | Codazzi ............ A47J 37/1247 |
| | | | 126/391.1 |
| 5,901,641 | A * | 5/1999 | McNamara ............ F28F 13/12 |
| | | | 126/391.1 |
| 6,029,653 | A | 2/2000 | Tiszai |
| 6,675,746 | B2 | 1/2004 | Gerstmann et al. |
| 6,736,131 | B2 | 5/2004 | Yamamoto et al. |
| RE39,309 | E | 10/2006 | McNamara |
| 7,690,376 | B1 | 4/2010 | Tucci et al. |
| 8,162,040 | B2 * | 4/2012 | Briselden ............ F23C 3/002 |
| | | | 165/109.1 |
| 9,021,941 | B2 | 5/2015 | Manson et al. |
| 2007/0089732 | A1 | 4/2007 | Ricord et al. |
| 2009/0277969 | A1 | 11/2009 | Briselden |

* cited by examiner

GAS HEAT EXCHANGER WITH BAFFLE FOR DEEP FAT FRYER

CROSS REFERENCE TO RELATED APPLICATION

This application claims the benefit of U.S. provisional application 62/476,179 filed Mar. 24, 2017 and is hereby incorporated by reference.

BACKGROUND OF THE INVENTION

The present invention relates to a gas heat exchanger for a submersion media cooker such as deep fat fryer, pasta cooker, or water bath rethermalizer, and in particular to a gas heat exchanger with a blower and a heat tube with a downstream baffle used therein.

Deep fat fryers, such as those commercially available under the trademark FryTech™ from Alto-Shaam®, Inc., located in Menomonee Falls, Wis. use heat tubes extending through oil vats to heat the surrounding cooking oil. The heat tubes can only heat the oil at the surface of the tubes, limiting the amount of heat transfer efficiency from the heat tubes to the surrounding oil.

SUMMARY OF THE INVENTION

The present invention provides a deep fat fryer providing an oil vat for holding hot oil. The hot oil of the vat is heated by a heat exchanger system which mixes the combustion air with the fuel gas prior to ignition (i.e., a "pre-mix" system) and includes a pair of heat tubes. The heat tubes contain burners for receiving the premixed heated air/gas and igniting a flame within the heat tubes. Heat transfer along the length of the heat tubes is facilitated by a heat conductive baffle material substantially filling the heat tubes, or air pathway within the heat tubes, in volume and in length. Heated air and gas are forced through the dense and elongated baffle by a blower as taught herein.

In one embodiment, the present invention may be a food fryer having a fryer tank adapted to hold a volume of cooking fat for cooking therein; at least one heat tube passing through the volume to be surrounded by cooking fat; and an internal baffle positioned within the heat tube to conduct heat from heated air passing through the heat tube to walls of the heat tube and extending from an inlet to an outlet of the heat tube along the length of the heat tube.

It is thus a feature of at least one embodiment of the present invention to increase the convective heat transfer coefficient and pressure drop ratio of the heated air by inducing turbulence and a cross-flow velocity component within the heat tube.

The internal baffle may be thermally conductive and in contact with an inner surface of the heat tube to conduct heat thereto.

It is thus a feature of at least one embodiment of the present invention to facilitate heat conduction from the heated air passing through the heat tube to the walls of the heat tube.

The baffle may extend across a diameter of the heat tube in at least two perpendicular directions. An internal volume of the heat tube may be at least 70% filled by a volume of the baffle. The length of the internal passage of the heat tube is at least 80% filled by a length of the baffle.

It is thus a feature of at least one embodiment of the present invention to increase the heat transfer surface area using a smaller shape or form factor for increased heat transfer to the heat tube in a confined area.

The baffle may provide air channels conducting the heated air in a spiral from the inlet to the outlet. The baffle may be helicoidal.

It is thus a feature of at least one embodiment of the present invention to reduce bypass effects, reduce fouling, prevent flow-induced vibration, and reduce maintenance/cleaning.

The baffle material may be silicon carbide. The baffle may have a conductivity of at least 15.2 W/(m-K).

It is thus a feature of at least one embodiment of the present invention to select materials that can withstand the high heat from the frying oil, heated air, but also impingement heat from the burner assembly.

The heat tube may be cylindrical. The heat tube may be stainless steel or carbon steel.

It is thus a feature of at least one embodiment of the present invention to select materials that can withstand the high temperature and pressure of the fryer oil and heater air flow.

The food fryer may further include a blower for blowing heated air through the heat tube. The food fryer may further include a gas burner producing a flame to produce heated air.

In one embodiment, the present invention may be a deep fat fryer having a housing providing a heater cavity separated from an adjacent fryer cavity by a common wall wherein the fryer cavity provides a vat holding a volume of frying fat having a floor opposite an upper opening where the frying fat may be accessible to a user; a blower held within the heater cavity and configured to deliver a heated gas from a gas source; a heat tube communicating with the blower and extending into the fryer cavity and spaced from the floor of the fryer cavity to be surrounded by frying fat and providing a cylindrical tubing having an outer surface exposed to the frying fat opposite an inner surface defining an internal passage supporting a flow of the heated gas therethrough the passage; and an impingement baffle positioned within the heat tube to conduct heat from the heated gas to walls of the heat tube and extending from an inlet to an outlet of the heat tube along a length of the heat tube. The impingement baffle may be thermally conductive and in contact with an inner surface of the heat tube to conduct heat thereto.

It is thus a feature of at least one embodiment of the present invention to save energy, reduce cost, and prolong the service life and operation time.

The baffle may be helicoidal having a spiral air channel conducting the heated air in a spiral from the inlet to the outlet of the heat tube.

The baffle may be a rolled mesh fabric of conductive material.

The baffle may be a set of concentric tubes having crenulated outer walls.

The baffle may be a porous refractory material.

These particular objects and advantages may apply to only some embodiments falling within the claims and thus do not define the scope of the invention.

DETAILED DESCRIPTION OF THE PREFERRED EMBODIMENT

Figure 1:
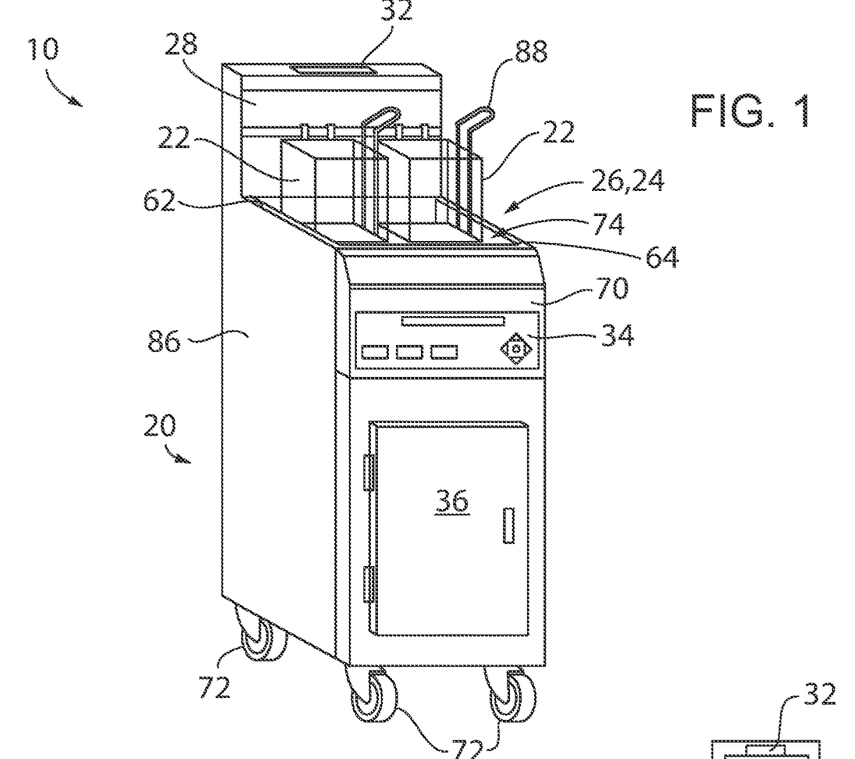
FIG. 1 is a perspective view of a first embodiment of the gas heat exchanger system of the present invention used within a deep fat fryer for heating oil.
Figure 2:
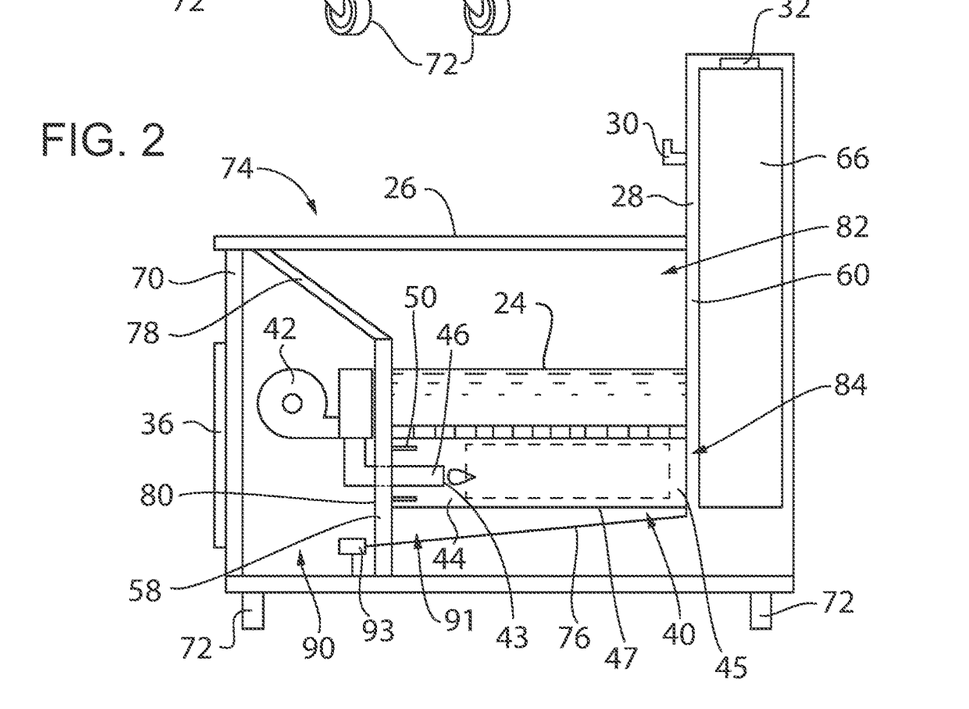
FIG. 2 is a side elevation view of the deep fat fryer of FIG. 1 with the outer covering removed and the baskets removed from the fryer.
Figure 3:
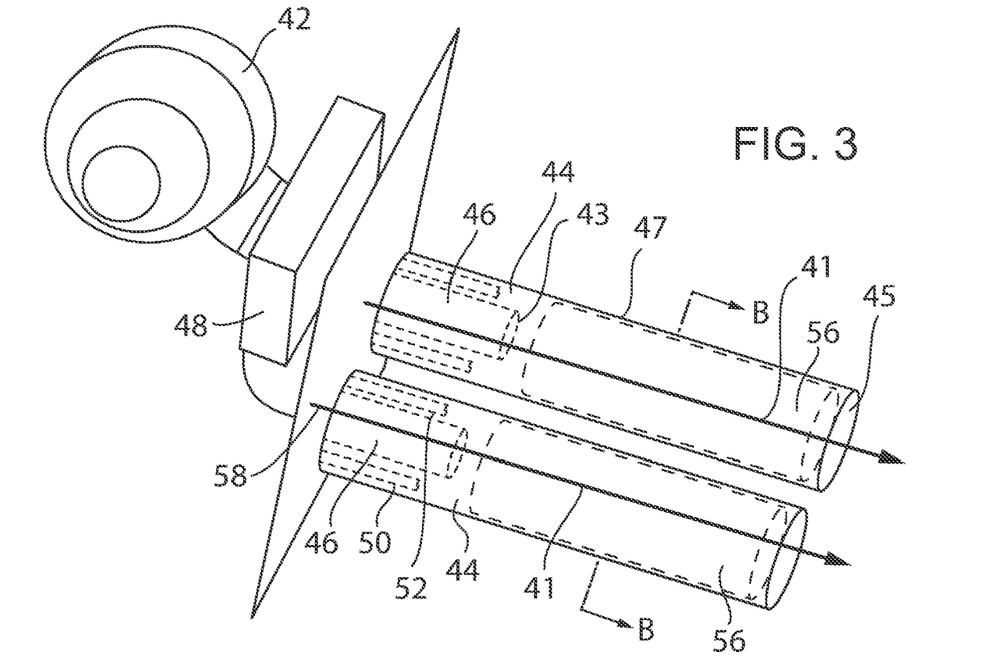
FIG. 3 is a perspective view of the blower gas valve system removed from the fryer showing the power fan coupled to the gas heat exchanger tubes and the tubes containing full cross sectional elongated baffles.

Referring to FIGS. 1-3, a heat exchange system 10 of the present invention may work within a deep fat fryer 20 of the type typically found in commercial kitchens. It is contemplated that the deep fat fryer 20 may also be used with other submersion media cookers such as pasta cookers and water bath rethermalizers. The fryer 20 provides a plurality of baskets 22 (for example, two baskets are shown in FIG. 1) for lowering and raising food items within the baskets 22 into and out of an oil vat 26 containing frying fat or hot cooking oil 24. The oil vat 26 provides a generally rectangular tank for holding cooking oil 24 that is heated by a forced air gas burner system 40 in accordance with the present invention, and to be further described below.

Referring now to FIG. 1, the fryer 20 of the present invention provides a stainless steel outer covering 86 protecting the interior contents of the fryer 20. The stainless steel is oxidation resistant to prevent corrosion and high temperature resistant to prevent deformation under the high heat of the fryer 20 (for example, 200 to 385 degrees Fahrenheit).

A front wall 70 of the fryer 20 may provide an exterior control panel 34 having a digital display and various control buttons for selection of on/off, power level, temperature selection, cooking modes, etc. The front wall 70 of the fryer 20 below the control panel 34 may also provide a door 36 enclosing an opening of the front wall 70 and providing easy access to the interior of the fryer 20. The fryer 20 may be moveably supported by a plurality of casters 72 allowing the fryer 20 to roll along a floor.

Referring also to FIG. 2, the fryer 20 provides an upper opening 74 allowing access to the oil vat 26. The oil vat 26 is defined by a front wall 58 and back wall 60 connected at their left and right ends by left 62 and right 64 walls respectively. A wall 76 defines a floor of the oil vat 26. A top end 78 of the front wall 58 may be angled downwardly into the vat 26 while the bottom end 80 of the front wall 58, back 60, left 62 and right 64 walls extend substantially vertical. The oil vat 26 may provide an approximately 62 lbs. oil capacity and may be approximately 18 inches deep. The oil vat 26 may be sufficiently deep so as to provide an upper region 82 for holding the baskets 22 and a lower heating region 84 for holding a forced air gas burner system 40, as will be described further below.

Above the back wall 60 of the oil vat 26 may be a splash back panel 28 for collecting grease, and also a basket hanger 30 for holding the baskets 22 clear of the cooking oil 24. The basket hanger 30 may be hooks or brackets for retaining a lip or edge of the baskets 22 and holding them above the cooking oil 24. The baskets 22 are typically made of wire mesh so as to allow the cooking oil 24 to drain from the food when the baskets 22 are hung on the basket hanger 30. The baskets 22 may include insulated handles 88 for gripping the baskets. The baskets 22 are typically arranged side by side within the oil vat 26.

An exhaust flue 66 may be located at a rear of the fryer 20 behind the oil vat 26 and connecting the oil vat 26 to a flue opening 32 at a top end of the flue 66. The flue opening 32 allows for the removal of heat and steam emanating from the oil vat 26.

The oil vat 26 is separated into an upper region 82 and a lower region 84 by basket supports 68 which extend between opposite walls of the oil vat 26 to support the baskets 22 above the forced air gas burner system 40, while still allowing cooking oil 24 to pass above the basket supports 68. The basket supports 68 are positioned to allow for partial submersion of the baskets 22 within the cooking oil 24 for cooking. The basket supports 68 may have holes, slots or comprise of rods to facilitate passage of the cooking oil 24.

Referring also to FIG. 3, the cooking oil 24 within the oil vat 26 is heated during cooking by a forced air gas burner system 40. A front end of the fryer 20 provides an interior space 90, generally in front of the oil vat 26, where the forced air gas burner system 40 may be installed. The forced air gas burner system 40 may be easily accessed through the door 36 at the front wall 70 of the fryer 20.

The forced air gas burner system 40 provides a blower 42 and a pair of heat tubes 44 extending from the blower 42 into the lower level of the oil vat 26. The heat tubes 44 may be cylindrical tubes approximately 14 inches long with a 3.5 inch outer diameter and 3.38 inch inner diameter. However, the lengths and diameters of the heat tubes 44 may vary so that they extend into the oil vat 26 between the front 58 and back 60 walls of the oil vat 26.

The tubes 44 are positioned above the floor 76 of the oil vat 26 thus providing a space 91 or "cold zone" at the bottom of the oil vat 26 for larger food particles to sink and be kept at a lower temperature to prevent burning. A drain valve 93 at a bottom of the oil vat 26 operated manually or by the electronic control, can close and open the lower outlet passageway. Actuating the valve 93 will allow cooking oil 24 to pass through the lower passageway to drain the cooking oil 24 from the oil vat 26.

The heat tube 44 material may be selected to have good thermal conductivity and strength since thermal stresses may occur during operation because of thermal expansion/contraction of the tube material and stresses from the high pressure of the heated air/gas 41 and cooking oil 24. The tube material may be selected for compatibility with both the internal and external fluids for long periods of time under the operating conditions (i.e., temperatures, pressures, pH, etc.) to minimize deterioration such as corrosion. It is desired that the tube material is strong, thermally-conductive, and corrosion-resistant. The tube material may be a metal, including, stainless steel or carbon steel. Fluoropolymers such as Perfluoroalkoxy alkane (PFA) and Fluorinated ethylene propylene (FEP) may also be used due to their high resistance to extreme temperatures.

Referring to FIG. 3, the forced air gas burner system 40 provides a pre-mix burner which mixes gas and forced air therein and then propels the mixed air/gas 41 under the influence of the forced air from the blower 42 prior to ignition (this is in contrast to an induced draft system in which the air is pulled through the heat tubes 44 from the opposite end of the heat tubes 44 by convection up the exhaust flue 66). The higher mixture pressures developed by the pre-mix burner enable greater combustion volumes into the combustion space.

The forced air gas burner system 40 provides a gas valve system that pre-mixes the natural gas or propane with air from the blower 42 or fan. After mixing, the premixed air/gas 41 travels through a common manifold 48 to a pair of burner tubes 46. The burner tubes 46 are arranged within the heat tubes 44. The diameter of the burner tubes 46 is less than the heat tubes 44 so that there is clearance around the burner tubes 46. The burner tubes 46 may be approximately 4 inches long with a 1⅝-1¾ inch diameter. The burner tubes 46 may be made of a material that can accommodate a gas firing rate of 5000-7000 btu/square inch. For example, the material of the burner tubes 46 may be a woven ceramic matrix (Nextel 312) or NiCrAl metal foam.

Extending adjacent to and along the burners tubes 46 may be a spark igniter rod 50 and a flame sensing rod 52. The spark igniter rod 50 produces a spark causing the premixed air/gas 41 traveling through and leaving the burner tubes 46 to become ignited producing a flame. The separate flame sensing rod 52 may sense the flame and send signals to an ignition safety module to control when the gas valves are opened or closed.

Premix burners generally produce a shorter and tighter flame than atmospheric (venturi) burners. The burners' smaller surface area and higher gas firing rates operate generally in radiant mode (versus blue flame mode). The radiant mode of the flame generally heats only approximately the first four inches of the heat tubes 44 while heat is lost through the remaining length of the tubes. To keep the thermal efficiency of the forced air gas burner system 40 high, the present invention provides a baffle 56 that is installed within the heat tubes 44 downstream from the burner tubes 46.

The internal baffle 56 is positioned within the heat tubes 44 to conduct heat from heated air/gas 41 passing through the heat tubes 44 and extending from a gas inlet 43 to a gas outlet 45 of the heat tubes 44 along a length of the heat tubes 44 to walls 47 of the heat tubes 44. The gas inlet 43 may be formed downstream from the burner tubes 46 at a position where air/gas 41 enters the heat tubes 44 from the distal end of the burner tubes 46. The gas outlet 45 may be downstream from the baffle 56 at a position where air/gas 41 exits the heat tubes 44.

The location of the baffle 56 from the distal end of the burner tubes 46 may vary. The baffle 56 may abut the burner tubes 46 or may be spaced as much as 14-18 inches away from the distal end of the burner tubes 46. However, the shorter length of the premix burner flame allows the baffle 56 to be positioned closer to the distal end of the burner tube 46 than with a longer flame because the shorter flame will not hit the baffle 56 and quench the flame and/or cause incomplete combustion. Thus, the baffle 56 may be generally positioned within two inches from the distal end of the burner tube 46.

As the heated air/gas 41 travels down the heat tubes 44, the heated air/gas 41 is forced to impinge the cross sectional baffle 56. The baffle 56 is sized to fill an entire cross-sectional area and length of the heat tubes 44 so that the baffle is materially distributed substantially evenly within the heat tubes 44 at high density. The baffle 56 may extend across a diameter of the heat tubes 44 in at least two perpendicular directions. An internal volume of the heat tubes 44 may be at least 60%, 70%, or 80% filled by a volume of the baffle 56. The length of the heat tubes 44 may be at least 60%, 70% or 80% filled by a length of the baffle 56. The length of the heat tubes 44 between the inlet 43 and outlet 45 may be at least 90% filled by a length of the baffle 56.

The internal baffle 56 is thermally conductive and in contact with an inner surface of the heat tubes 44 to conduct heat thereto. For example, the outer edges or boundary of the baffle 56 may provide a conductive physical connection with the inner surface of the heat tubes 44.

While the heat tubes 44 are shown as having a generally circular cross-section, the baffle 56 may be used in heat tubes 44 of different cross sectional shapes, for example, oval or rectangular, with the baffle 56 similarly shaped to fill substantially an entire cross section of the heat tube 44.

The baffle 56 is generally constructed of a flame and oxidation resistant material. The material may be generally porous providing openings or passageways to allow the heated air/gas 41 to pass therethrough, yet dense enough to maximize heat transfer from the heated air/gas 41 to the walls 47 of the heat tubes 44. Generally, this density requires the blower 42 to force the heated air/gas 41 through the baffle 56.

The porosity of the material may vary in different embodiments but will typically be homogenous within a given embodiment while the heat conductive material generally encompasses greater than 50% of the volume compared to air. The material of the baffle 56 may generally be equal to or more conductive than ordinary glass (>0.8 W/(m K)). The use of the baffle 56 within the heat exchanger tube has been shown to improve thermal efficiency by as much as 10-20% over non-baffle systems.

While the location, size, and porosity of the baffle 56 may vary, the baffle 56 may be constructed as described below in the following exemplary embodiments.

Embodiment 1

Figure 4A:
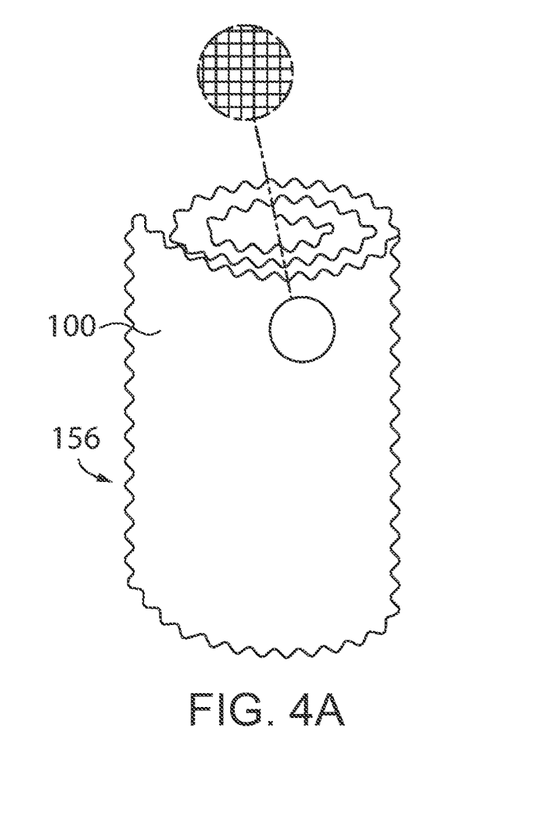
FIGS. 4A and 4B are a perspective view and cross sectional view taken along line B-B of FIG. 3, respectively, of a first embodiment of the elongated baffle made of a mesh fabric.
Figure 4B:
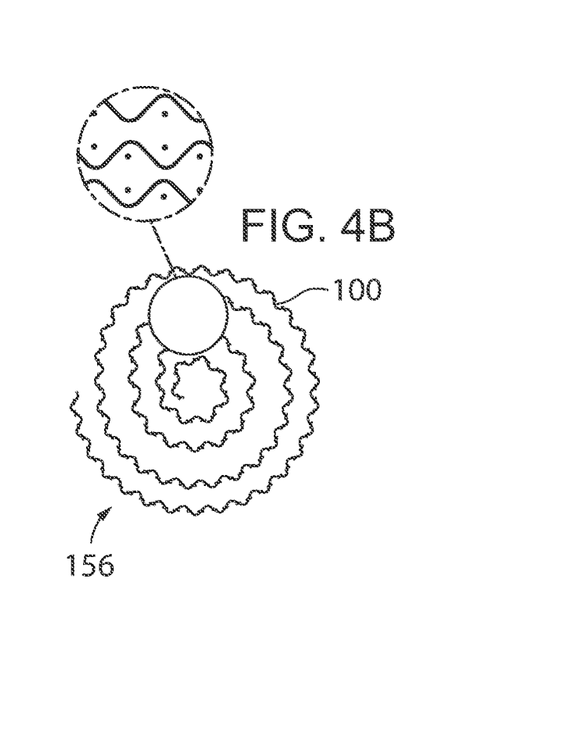

Referring to FIGS. 4A-B, a first embodiment of the invention provides a baffle 156 made of knitted wire mesh. Knitted wire mesh sheets 100 may be rolled into cylindrical tubes matching the inner diameter of the heat tubes 44 and encompassing substantially the entire cross sectional area of the tubes 44. Generally the mesh sheets 100 forms a spiral in cross-section. Alternatively, the mesh sheets 100 may form concentric circles in cross-section.

Support frames may be used or the wire material may be sintered or welded together at intersections both within the mesh sheets 100 and among different layers of the mesh sheets 100 to minimize drooping.

The knitted wire mesh sheets 100 may have wire gauges of 0.011 to 0.024 and may be knitted in different patterns to vary the porosity. In addition, the mesh sheets 100 may have a crimp pattern. The thin wires of the baffle 156 provide radiant mode quickly to transfer heat through the heat tubes 44 while also cooling quickly to limit the amount of temperature overshoot when the burners are turned off.

The knitted wire mesh sheets 100 may be a material containing nickel (304, Inconel 600, X750 Alloy, 601), non-nickel Aluchrom 1 (FeCrAl), Kanthal (APM, AF), Aluchrom Y, Alloy (837, 875PM). Different materials may be used along the length of the baffle 156, for example, a first knitted wire material may be used closer to the frame, and a second knitted wire material used further away from the flame. For example, the first material may have greater heat resistance than the second material.

The baffle 156 may be approximately 4-6 inches in length with 3-3.5 inches diameter. The baffle 156 may weigh 0.30 lbs. or 1.00 lbs. The baffle 156 may have a density of 2.23E-5 lb/in$^3$ or 4.10E-5 lb/in$^3$.

Embodiment 2

Figure 5A:
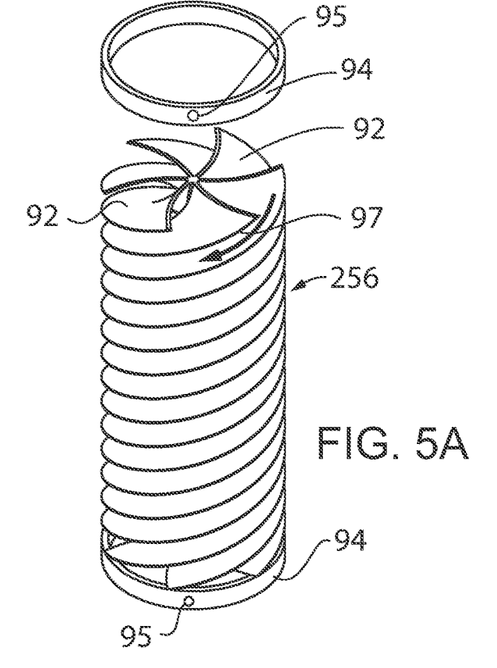
FIGS. 5A and 5B are a perspective view and cross sectional view taken along line B-B of FIG. 3, respectively, of a second embodiment of the elongated baffle made of a helicoid.
Figure 5B:
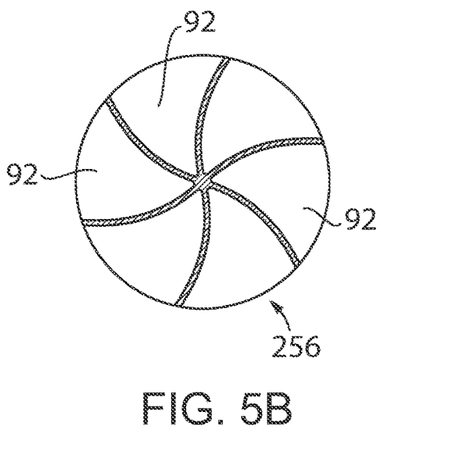

Referring to FIGS. 5A-B, a second embodiment of the invention provides a baffle 256 formed in a helical or helicoid formation. The baffle 256 may have a helix as its boundary, and may coil or curve in a spiral form. The baffle 256 may form air passageways where the heated air/gas 41 is conducted in a spiral air path 97 between the gas inlet 43 to the gas outlet 45 of the heating tubes 44.

The baffle 256 may provide a plurality of spiraled fins 92 increasing the surface area within the heating tubes 44 and increasing the turbulence within the heating tubes 44. The fins 92 may have an inclination of angle of approximately 40 degrees.

The outer ends of the baffle 256 may be flanked by collar rings 94 on opposite ends of the baffle 256 to seal the end of the baffle 256 and the inner surface of the walls 47 of the heat tubes 44 to direct heated air/gas 41 flow through the spiral air path 97 created by fins 92 of the baffle instead of along the outer edges of the baffle 256 between the baffle 256 and the walls 47.

The collar rings 94 may support a hole 95 allowing an alignment peg 95 attached to the walls 47 of the heat tubes 44 to extend therethrough the hole 95 and prevent the helical baffle 256 from moving or rotating within the heat tubes 44 during high velocity gas flow through the heat tubes 44.

The baffle 256 may be made of silicon carbide or Kanthal type material. The baffle 256 may have a conductivity of at least 15.2 W/(m-K).

The baffle 256 may be approximately 4-6 inches in length with 3-3.5 inch diameter, matching the inner diameter of the heat tubes 44 and encompassing the entire cross sectional area of the tubes 44. The helical baffle 256 may weigh 1.15 or 1.9 lbs. The baffle 256 may have a density of 4.71E-5 lb/in$^3$ or 7.78E-5 lb/in$^3$.

Embodiment 3

Figure 6A:
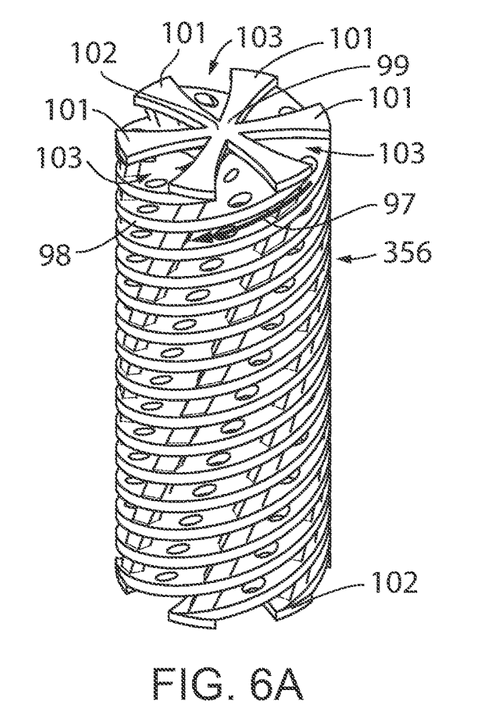
FIGS. 6A and 6B are a perspective view and cross sectional view taken along line B-B of FIG. 3, respectively, of a third embodiment of the elongated baffle made of a helicoid.
Figure 6B:
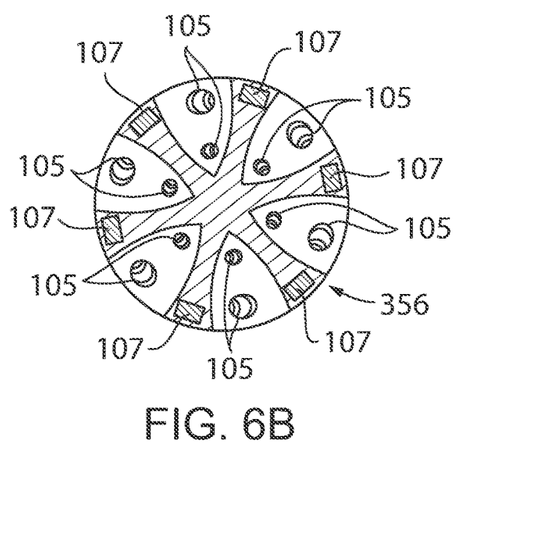

Referring to FIGS. 6A-B, a third embodiment of the invention provides a baffle 356 that is a variation of baffle 256 having a helical or helicoid formation.

Instead of or in addition to the collar rings 94 at the outer ends of the baffle 256, the baffle 356 may include end plates 102 providing substantially flat outer edges at the outer ends of the baffle 356 and providing outwardly extending vanes 101 from a central hub 99 providing air inlets 103 therebetween the vanes and directing heated air/gas 41 to flow into the air inlets 103 and along the spiral air path 97 created by the baffle 356.

The baffle 356 may be formed by at least one divider plate 98 extending along a longitudinal axis of the heat tube 44 and having opposed flutes following a spiral path. The baffle 356 may include multiple divider plates 98 angularly rotated with respect to each other.

Each of the divider plates 98 may include air vents in the form of holes 105 formed in the divider plates 98 and also forming a spiral path whereby the heated air/gas 41 may be further conducted in the spiral air path 97 between the gas inlet 43 to the gas outlet 45 of the heating tubes 44.

Standoffs 107 may be formed between adjacent spiraled layers of the divider plates 98 toward the outer edge of the baffle 356 to provide additional structural support.

It is understood that any combination of the features of baffle 256 and baffle 356 may be chosen and used in combination or in substitution of each other and is not limited by the combination of features shown in the illustrated embodiments.

Embodiment 4

Figure 7A:
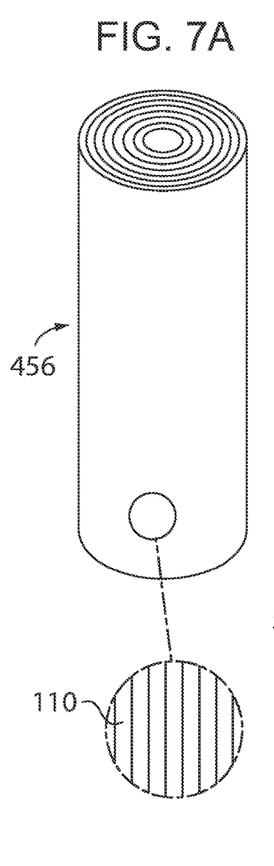
FIGS. 7A and 7B are a perspective view and cross sectional view taken along line B-B of FIG. 3, respectively, of a fourth embodiment of the elongated baffle made of concentric tubes of crenulated material.
Figures 7B, 8A, 8B:
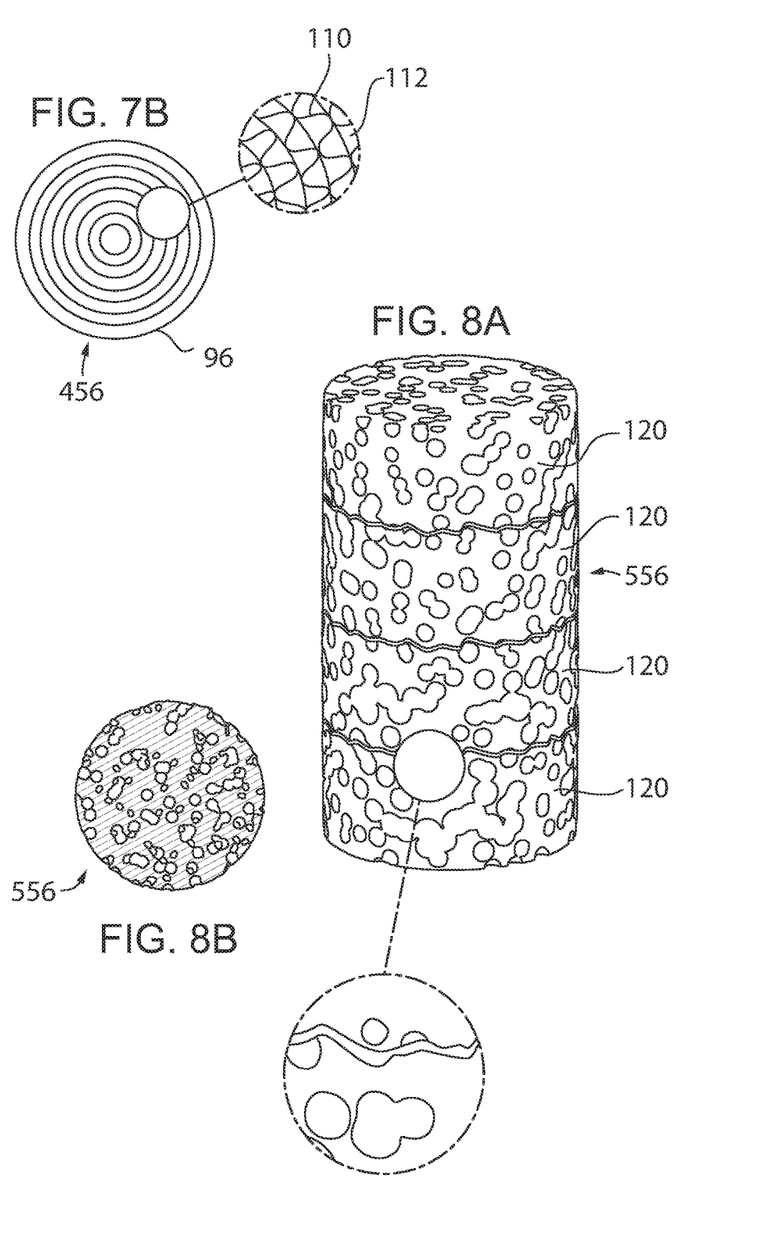
FIGS. 8A and 8B are a perspective view and cross sectional view taken along line B-B of FIG. 3, respectively, of a fifth embodiment of the elongated baffle made of stacked porous refractory material.

Referring to FIGS. 7A-B, a fourth embodiment of the invention provides a baffle 456 formed in concentric layers or cylindrical tubes in corrugated fashion.

The baffle 456 may be made of catalytic converter materials such as a high aluminum or high chromium ferritic stainless steel produced using a cold roll bonding process. For example, the catalytic converter baffle 456 may be tightly rolled coils or concentric tubes of untreated corrugated or crenulated steel 110, for example, Durafoil™, Dieselfoil™, or FeCrAl foil, and flanked by uncorrugated separator layers 112. The corrugation of the steel 110 may vary between 100-300 corrugations per inch. The corrugation may be arranged in a zigzag pattern to allow for turbulent flow. The baffle 456 may be contained by an outer containment layer 96 made of steel.

The catalytic converter baffle 456 may be approximately 4-6 inches in length with 3-3.5 inch diameter, matching the inner diameter of the heat tubes 44 and encompassing the entire cross sectional area of the tubes 44.

Embodiment 5

Referring to FIGS. 8A-B, a fifth embodiment of the invention provides a baffle 556 made of porous refractory material. The porous refractory material may be reticulated ceramic foam (e.g., Zirconia, Zirconia-Alumina) or a reticulated metal foam (e.g., NiCrAl, FeCrAl) material. The porosity may have a CPI porosity of 10, 20, or 30.

The reticulated foam baffle 556 may be approximately 4-6 inches in length and 3-3.5 inches in diameter, matching the inner diameter of the heat tubes 44 and encompassing the entire cross sectional area of the tubes 44. Shorter cylindrical sections 120 of the material may be stacked to provide the full length of the baffle 556. For example, four approximately one inch cylindrical sections 120 may be stacked to form 4 inches in total length.

The reticulated foam baffle 556 may weight 0.45 or 0.70 lbs. The density of the baffle 456 may be 2.76E-5 lb/in$^3$ or 4.30E-5 lb/in$^3$.

It is understood that any combination of baffle shape/configuration, baffle material, and/or features may be chosen from the above exemplary embodiments of the present invention. The present invention is not limited to the embodiments described herein.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A food fryer comprising:
    a fryer tank adapted to hold a volume of cooking fat for cooking therein;
    at least one heat tube passing through the volume to be surrounded by the cooking fat;
    a blower adapted to receive air and gas and deliver mixed air and gas downstream to the at least one heat tube;
    a gas burner producing a flame to heat the mixed air and gas; and
    an internal baffle positioned within the at least one heat tube to conduct heat from heated air and gas passing through the heat tube to walls of the heat tube and extending from an inlet to an outlet of the heat tube along a longitudinal axis extending along a length of the heat tube;
    wherein the internal baffle is formed by a curved plate winding about a baffle axis to form a helicoid wherein the curved plate carries a plurality of holes distributed along a length of the internal baffle and at more than one distance from the baffle axis of the internal baffle;
    wherein the internal baffle provides a helical channel conducting the heated air and gas in a helical path winding about the baffle axis of the internal baffle as it moves along the longitudinal axis from the inlet to the outlet of the heat tube.

2. The food fryer of claim 1 wherein the internal baffle is thermally conductive and in contact with an inner surface of the heat tube to conduct heat thereto.

3. The food fryer of claim 2 wherein the internal baffle extends across a diameter of the heat tube in at least two perpendicular directions.

4. The food fryer of claim 3 wherein an internal volume of the heat tube is at least 80% filled by a volume of the internal baffle.

5. The food fryer of claim 4 wherein the length of the heat tube is at least 80% filled by a length of the internal baffle.

6. The food fryer of claim 1 wherein the internal baffle material is silicon carbide.

7. The food fryer of claim 1 wherein the internal baffle has a conductivity of at least 15.2 W/(m-K).

8. The food fryer of claim 1 wherein an outer footprint of the heat tube is cylindrical.

9. The food fryer of claim 1 wherein the heat tube is at least one of aluminum, copper alloy, stainless steel, carbon steel, non-ferrous copper alloy, Inconel, nickel, Hastelloy and titanium.

10. The food fryer of claim 1 further comprising first and second end plates attached to opposed ends of the internal baffle respectively and each having a central hub supporting outwardly extending spokes.

11. The food fryer of claim 1 further comprising standoffs separating adjacent layers of the curved plate.

12. A deep fat fryer comprising:
    a housing providing a heater cavity separated from an adjacent fryer cavity by a common wall wherein the fryer cavity provides a vat holding a volume of frying fat for cooking having a floor opposite an upper opening where the frying fat may be accessible to a user;
    a blower held within the heater cavity and configured to receive air and gas and deliver mixed air and gas downstream;
    a gas burner producing a flame to heat the mixed air and gas;
    a heat tube communicating with the blower and extending into the fryer cavity and spaced from the floor of the fryer cavity to be surrounded by frying fat and providing a cylindrical tubing having an outer surface exposed to the frying fat opposite an inner surface defining an internal passage supporting a flow of the heated gas therethrough the passage; and
    an impingement baffle positioned within the heat tube to receive the heated gas and conduct heat from the heated gas to walls of the heat tube and extending from an inlet to an outlet of the heat tube along a longitudinal axis extending along a length of the heat tube,
    wherein the impingement baffle is formed by a curved plate winding about a baffle axis to form a helicoid wherein the curved plate carries a plurality of holes distributed along a length of the internal baffle and at more than one distance from the baffle axis;
    wherein the impingement baffle is thermally conductive and in contact with an inner surface of the heat tube to conduct heat thereto
    wherein the impingement baffle provides a helical channel conducting the heated air and gas in a helical path winding about the baffle axis as it moves from the inlet to the outlet.

13. The deep food fryer of claim 12 further comprising first and second end plates attached to opposed ends of the impingement baffle respectively and each having a central hub supporting outwardly extending spokes.

14. The deep food fryer of claim 12 further comprising standoffs separating adjacent layers of the curved plate.

15. A cooking appliance comprising:
    a tank adapted to hold a volume of fluid for cooking therein;
    at least one heat tube passing through the volume to be surrounded by the fluid;

a blower adapted to receive air and gas and deliver mixed air and gas downstream to the at least one heat tube;

a gas burner producing a flame to heat the mixed air and gas; and an internal baffle positioned within the at least one heat tube to conduct heat from heated air and gas passing through the heat tube to walls of the heat tube and extending from an inlet to an outlet of the heat tube along a longitudinal axis extending along a length of the heat tube;

wherein the internal baffle is formed by a curved plate winding about a baffle axis to form a helicoid wherein the curved plate carries a plurality of holes distributed along a length of the internal baffle and at more than one distance from the baffle axis of the internal baffle;

wherein the internal baffle provides a helical channel conducting the heated air and gas in a helical path winding about the baffle axis of the internal baffle as it moves from the inlet to the outlet.

16. The cooking appliance of claim 15 further comprising first and second end plates attached to opposed ends of the internal baffle respectively and each having a central hub supporting outwardly extending spokes.

17. The cooking appliance of claim 15 further comprising standoffs separating adjacent layers of the curved plate.

* * * * *